United States Patent [19]
Wilkie

[11] 3,829,703
[45] Aug. 13, 1974

[54] POWER SENSING AND SHUT-OFF APPARATUS

[75] Inventor: Wallace J. Wilkie, Ann Arbor, Mich.

[73] Assignee: Sensorlok Corporation, Ann Arbor, Mich.

[22] Filed: Feb. 13, 1973

[21] Appl. No.: 332,074

[52] U.S. Cl............................. 307/18, 307/25, 173/2
[51] Int. Cl............................................... H02j 1/10
[58] Field of Search........... 307/18, 25, 118, 92, 94; 173/2, 4, 50; 251/129; 340/240, 320; 137/487.5

[56] References Cited
UNITED STATES PATENTS
2,409,397  10/1946  Sheehan et al. ..................... 173/2

Primary Examiner—Herman J. Hohauser
Attorney, Agent, or Firm—Olsen & Stephenson

[57] ABSTRACT

Apparatus in a combination system utilizing electric and fluid power systems for driving equipment or machinery wherein all power systems are interrupted upon the failure or loss of any one power source. The apparatus will prevent the automatic re-activation of the driven equipment upon the reestablishment of power following a failure or loss of power. Shut-off of the multiple power systems can also be accomplished through a single switch either manually or automatically.

10 Claims, 1 Drawing Figure

PATENTED AUG 13 1974 3,829,703
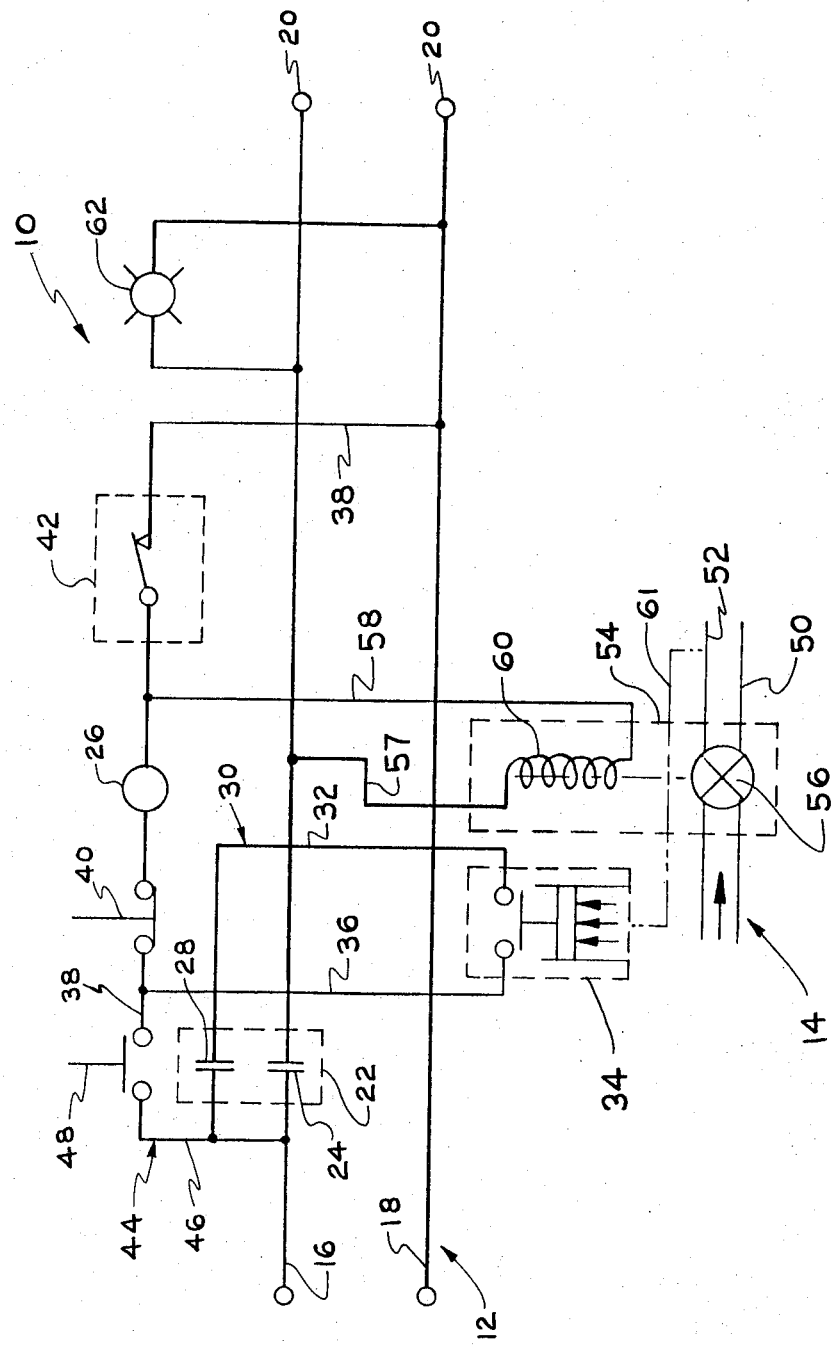

POWER SENSING AND SHUT-OFF APPARATUS

BACKGROUND OF THE INVENTION

The present invention relates to control apparatus primarily adapted for use in multiple power systems.

It is common practice in industry to employ multiple power systems for driving power tools or other similar types of equipment or machinery. A typical example is an electric drill press having a compressed air actuated cylinder providing the quill feed and an electric motor for turning the drill bit. Should this dual powered machine tool experience an electric power failure, the air system would continue to feed the quill down into the workpiece with the drill bit not turning. Under these circumstances, there exists a strong possibility of damage to the power tool, the workpiece or the tooling fixture. Additionally, the drill bit may fracture with the potential of causing injury to the machine operator.

In addition to the problems noted above that may arise when using power tools having dual power systems, other problems may also arise upon the re-establishment of power following a failure or interruption of any one power source. For obvious reasons, it is often very undesirable to have the machinery or power tool re-activated under these circumstances merely as an incident to power restoration.

SUMMARY OF THE INVENTION

The present invention has overcome the inadequacies of the prior art and provides apparatus which will automatically sense the loss of electrical or fluid power in a combination power system and will interrupt all forms of power supplied to a power tool or similar piece of equipment upon the loss of any one or more sources of power. In other words, this invention provides two power systems that are dependent on each other in the sense when one system is activated, it activates the other system, and when either fails the other is deactivated. The apparatus is also constructed and arranged to prevent the automatic re-activation of the power tool upon the re-establishment of power following a failure or interruption of any one power source. Further, the apparatus is arranged so that shut-off of the multiple power sources can be accomplished through a single switch or operator, either manually or through remote sensors. The remote sensors may be a part of the power tool itself to provide a measure of self-sensing of failure within the power tool.

According to a preferred embodiment of the present invention, apparatus is provided for use in a combination power system utilizing electric and fluid power systems. The apparatus comprises a first conductor system including electrical conductors for supplying electric power, relay means normally maintaining the power circuit through the electrical conductors open, and by-pass and holding circuit means for energizing the relay means to close the power circuit and to hold the power circuit closed. The apparatus has a second conductor system including electrically initiated valve means normally interrupting or closing a conduit or power circuit for supplying the fluid of the second conductor system, the valve means being responsive to electrical initiation to open to permit supply of power through the second power system. The electrically initiated valve means is electrically associated with first power system so that it is electrically initiated only when the relay means is energized. The holding circuit means includes a first normally open switch which will maintain a closed position in response to a preselected pressure condition in the fluid conduit indicating that power is available through the power circuit of the second conductor system. A second switch means in the holding circuit consists of a set of normally open relay contacts which are closed when power is initiated in the first conductor system. The by-pass circuit also includes a selectively operable manual switch for initially energizing the relay means in response to momentary closing of this switch. The by-pass and holding circuit means also includes a normally closed switch in series with the relay coil for momentarily opening the circuit to de-energize the relay means, thereby permitting an operator to shut off the multiple power sources simultaneously merely by opening the switch. A second normally closed interlock switch is also provided which is electrically in series with the relay means and which may include any conventional type of sensing switch which can be opened either manually or in response to sensing a condition at a remote location, such as in the power tool being controlled.

Thus it is among the objects of the present invention to provide improved apparatus for controlling operation of power supply systems to power tools and the like wherein multiple power sources are utilized.

Other objects of this invention will appear in the following description and appended claims, reference being had to the accompanying drawings forming a part of this specification wherein like reference characters designate corresponding parts in the several views.

BRIEF DESCRIPTION OF THE DRAWING

The FIGURE of the drawing is a schematic illustration of apparatus embodying the present invention.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. The apparatus 10 which embodies the present invention includes a first conductor system 12 for supplying electrical power and a second conductor system 14 for supplying fluid power. The fluid can be either a gas or a liquid.

The first conductor system 12 includes a power circuit comprising the electrical conductors 16 and, 18 for supplying electrical power to a power tool (not shown) via the output terminals 20. A relay 22 is provided which has two sets of normally open contacts 24 and 28. A coil 26 is operable when energized to close the contacts 24 and 28. The contacts 24 are located in the conductor 16 and the contacts 28 are located in a relay holding circuit 30 which includes therein normally open contacts 28, conductor 32, a first normally open pressure switch 34, conductor 36, and conductor 38 with normally closed switch 40, relay coil 26, and remote interlock switch 42 therein. Thus it can be seen that when the relay coil 26 is energized, the electrical power circuit of the first conductor system 12 will be closed through contacts 24 to supply electrical power to the output terminals 20.

Associated with the holding circuit 30 is a by-pass circuit 44. The by-pass circuit 44 includes a conductor 46 which extends between conductors 16 and 38. A selectively operable manual switch 48 is interposed in conductor 46. The by-pass circuit 44 also includes the conductor 38 and the circuit elements 26, 40 and 42 therein. Together the circuits 30 and 44 form a by-pass and holding circuit means.

The second conductor system 14 includes the power circuit or conduit 50 which is adapted to provide high pressure fluid from its downstream end 52 to a power tool (not shown) or the like. An electrically initiated valve means 54 is provided which includes a valve element 56 normally interrupting or closing the conduit 50. The electrically initiated valve means 54 includes a coil 60 connected across the output terminals 20 by conductors 57 and 58 which connect to the conductors 16 and 18 respectively. The valve element 56 is normally in a closed position, but when the coil 60 is energized the valve element 56 will be moved to an open position.

The relay coil 26 is initially energized by manually closing switch 48 completing the circuit from conductor 16 through conductors 46 and 38 to conductor 18. Energizing the relay coil 26 activates relay 22 closing contacts 24 permitting electrical power to be supplied to the output terminals 20. However, the relay 22 will open on release of manual switch 48 unless holding circuit 30 is activated before switch 48 is released to the normally open position. On energizing of relay 22, valve coil 60 is energized to move valve 56 to an open position permitting fluid to pass through conductor 50. When the fluid pressure downstream of valve element 56, transmitted via conduit 61 to pressure switch 34, reaches a preselected value, switch 34 closes thus completing the relay holding circuit through the relay contacts 28. Until all these events occur, manual switch 48 must be held closed or the entire system returns to the deactivated state.

Assume the apparatus 10 has been functioning properly and that now an interruption in the supply of current to lines 16 and 18 has occurred. Relay coil 26 is de-energized, the contacts 24 and 28 open de-energizing valve coil 60 so that the valve element 56 will move to a position to interrupt power supply in the second conductor system 14. Therefore, if a power failure or interruption should occur in the first conductor system 12, the relay coil 26 will be de-energized thereby de-energizing the electrically initiated valve means 54 so that the power supply through the second conductor system will simultaneously be interrupted.

Failure or interruption of the power supply in the second conductor system 14 will also serve to interrupt the power supply in the first conductor system 12. This result is accomplished by the operation of the first normally open pressure switch 34 which is responsive via the conduit 61 to the pressure condition in the conduit 50. When a preselected pressure exists, the pressure switch 34 will be actuated to close the holding circuit 30, but in the absence of the requisite power in the second conductor system 14, the pressure switch 34 will open, de-energizing the relay coil 26. Thus it can be seen that a power failure in either the first conductor system 12 or the second conductor system 14 will result in an immediate interruption of power in the other system. Furthermore, restoration of the power in either or both systems will have no bearing on operation of the power tool (not shown) because both power systems will remain interrupted until the normally open switch 48 in the by-pass circuit 44 is momentarily closed. As previously understood, this action will serve to energize the relay coil 26 closing contacts 24 and 28 which will then cause the initiated valve means 54 to be energized, and provided that suitable pressure conditions exist in the conduit 50 to close pressure switch 34, the holding circuit 30 will be energized to hold contacts 24 and 28 closed thereby maintaining continuity between conductors 16 and 17.

Preferably, the conduit 61 is connected to the conduit 50 at the downstream side of the electrically initiated valve means 54 so that if any fault in operation of the valve element 56 should occur, then the apparatus 10 will serve to detect this fault thereby preventing supply of the power to the combination power system embodying the first conductor system 12 and the second power system 14.

The remote interlock switch 42 can be operated either manually or through remote sensors. These sensors may be conventional sensing devices such as temperature switches, limit switches, pressure switches, proximity switches or other similar sensing devices. These sensing devices may be located within the power tool (not shown) or at other suitable locations.

If desired a signal lamp 62 may be provided across the conductors 16 and 18 to indicate visually when the combination power system is supplying power through the two conductor systems 12 and 14 or when the systems are simultaneously interrupted.

What is claimed is:

1. In a combination power system utilizing two separate power sources wherein the power is supplied through separate first and second conductor systems, at least the first of which is electrical, said first conductor system including electrical conductors for supplying electrical power, said second conductor system including electrically initiated means normally interrupting the power circuit of the second conductor system and responsive to electrical initiation to permit supply of power through said second power system, by-pass and holding circuit means operatively associated with said first and second systems and providing for a mutual dependence of said systems on each other, said by-pass and holding circuit means including selectively operable switch means operable to initiate supply of power through one of said systems, said by-pass and holding circuit means further including contact means movable to an open position in response to loss of power in said second conductor system, and means responsive to supply of power through one of said systems to provide for initiation of supply of power through the other one of said systems.

2. The combination power system defined in claim 1 further including electrically energizable means operable when energized to provide for supply of power through said conductors, said switch means being operatively associated with said electrically initiated means and said electrically energizable means so that in response to actuation of said switch means one of said electrical means is electrically energized to provide for supply of power to one of said systems.

3. The combination power system defined in claim 2 wherein said electrically energizable means is a relay that is energized in response to actuation of said switch means, said relay having a set of normally open contacts in circuit with said electrically initiated means providing for electrical initiation thereof in response to closing of said contacts and also providing for interruption of said second conductor system in the event said relay is de-energized.

4. The combination power system defined in claim 3, wherein said second conductor system supplies fluid under pressure, the power circuit of the second conductor system being a conduit for passage of the fluid, and said electrically initiated means includes a valve normally closing said conduit.

5. The combination power system defined in claim 4, wherein said contact means comprises a pressure switch responsive to pressure conditions in said conduit and connected to said relay so that when said pressure switch is open said relay is de-energized to thereby interrupt said first conductor system.

6. The combination power system defined in claim 5, wherein said by-pass and holding circuit means includes a by-pass circuit and a holding circuit, and said pressure switch is connected in said holding circuit in series with said relay.

7. The combination power system defined in claim 6, wherein said relay has a second set of normally open contacts connected in said holding circuit in series with said relay.

8. The combination power system defined in claim 7, wherein a normally closed interlock switch is electrically connected from a remote position with said relay for de-energizing said relay when opened.

9. The combination power system defined in claim 8, wherein said normally closed interlock switch is manually operable for movement to an open position.

10. The combination power system defined in claim 8, wherein said normally closed interlock switch includes a sensing means and is operable for movement to an open position by said sensing means.

* * * * *